(12) United States Patent
Sahu et al.

(10) Patent No.: US 12,258,943 B2
(45) Date of Patent: Mar. 25, 2025

(54) LUBRICATION SYSTEM FOR A PITCH BEARING OF A WIND TURBINE

(71) Applicant: General Electric Renovables Espana, S.L., Barcelona (ES)

(72) Inventors: Jitendra Kumar Sahu, Bangalore (IN); Gerard Iain Madden, Leighton Buzzard (GB)

(73) Assignee: General Electric Renovables Espana, S.L., Barcelona (ES)

( * ) Notice: Subject to any disclaimer, the term of this patent is extended or adjusted under 35 U.S.C. 154(b) by 141 days.

(21) Appl. No.: 18/096,096

(22) Filed: Jan. 12, 2023

(65) Prior Publication Data
US 2023/0228254 A1 Jul. 20, 2023

(30) Foreign Application Priority Data
Jan. 14, 2022 (IN) .............................. 202211002266

(51) Int. Cl.
| | |
|---|---|
| *F16C 33/66* | (2006.01) |
| *F03D 80/70* | (2016.01) |
| *F16C 33/72* | (2006.01) |

(52) U.S. Cl.
CPC .............. *F03D 80/70* (2016.05); *F16C 33/66* (2013.01); *F16C 33/72* (2013.01); *F05B 2260/98* (2013.01); *F16C 2360/31* (2013.01)

(58) Field of Classification Search
CPC .. F16C 33/6685; F16C 2360/31; F16N 31/02; F05B 2240/50–54; F05B 2260/98; F03D 80/70; F03D 80/705; F03D 80/709
See application file for complete search history.

(56) References Cited

U.S. PATENT DOCUMENTS

| | | |
|---|---|---|
| 6,991,378 B2 | 1/2006 | Jacquemont et al. |
| 8,690,442 B2 | 4/2014 | Baun et al. |

(Continued)

FOREIGN PATENT DOCUMENTS

| | | |
|---|---|---|
| CN | 107143743 A | 9/2017 |
| EP | 1273814 B1 | 3/2007 |

(Continued)

OTHER PUBLICATIONS

The EP Search Report for EP application No. 23150976.1, Jun. 9, 2023, 8 pages.

(Continued)

*Primary Examiner* — Alan B Waits
(74) *Attorney, Agent, or Firm* — Dority & Manning, P.A.

(57) ABSTRACT

A lubrication system for a pitch bearing of a wind turbine includes a lubricant for lubricating contact surfaces between an outer race, an inner race, and a plurality of rolling elements of the pitch bearing. Further, the lubrication system includes a lubricant inlet formed into a first side of the inner race and an inlet seal for sealing the lubricant inlet so as to prevent the lubricant from leaking from the lubricant inlet. Moreover, the lubrication system includes a lubricant outlet formed into an opposing, second side of the inner race and a lubricant collection container arranged adjacent to and in fluid communication with the lubricant outlet and mounted to the inner race. Thus, during operation of the wind turbine, at least one of a slope of the pitch bearing, gravity, and a centrifugal effect cause the lubricant to flow throughout the pitch bearing to lubricate the contact surfaces without exiting a closed volume defined by the inlet seal(s) and the lubricant collection container(s).

19 Claims, 7 Drawing Sheets

(56) References Cited

U.S. PATENT DOCUMENTS

| | | | |
|---|---|---|---|
| 2003/0048963 A1* | 3/2003 | Jacquemont | F16C 33/6622 384/462 |
| 2012/0134831 A1* | 5/2012 | Tiscareno | F03D 80/70 384/473 |
| 2012/0170879 A1* | 7/2012 | Bauer | F03D 80/00 384/91 |
| 2014/0205456 A1* | 7/2014 | Pasquet | F03D 7/0224 416/155 |
| 2019/0136910 A1* | 5/2019 | Catalano | F16C 33/363 |

FOREIGN PATENT DOCUMENTS

| | | |
|---|---|---|
| EP | 2546512 A1 | 1/2013 |
| EP | 2546516 A1 | 1/2013 |
| EP | 2592325 A1 | 5/2013 |
| EP | 3179123 A1 | 6/2017 |

OTHER PUBLICATIONS

Grupo Tecnico Rivi, Centralized and automatic lubrication in Windturbines, Jun. 9, 2020, pp. 16-17. http://www.rivi.net/en/applications/renewable-energy-windturbines/systems-renewable_energy-windturbines-eng.pdf.

* cited by examiner

LUBRICATION SYSTEM FOR A PITCH BEARING OF A WIND TURBINE

FIELD

The present disclosure relates generally to wind turbines and, more particularly, to a lubrication system for a pitch bearing of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the nacelle and the rotor blades relative to the direction of the wind, wind turbines typically include one or more yaw and/or pitch bearings. Such bearings are typically slewing bearings that support a heavy but slow-turning or slow-oscillating load. Typical yaw and/or pitch bearings include an outer race, an inner race, and a plurality of rolling elements configured between the races. As such, yaw bearings permit rotation of the nacelle and are mounted between the tower and the nacelle, whereas pitch bearings permit rotation of the rotor blades and are mounted between the rotatable hub and one of the rotor blades.

Blade pitch rotation is a function of the wind speed (low winds require the rotor blades to be arranged at a minimum pitch angle and high winds require the pitch angle to be varied by rotating the rotor blade in order to change pitch angle). For both cases, it is important to perform sufficient lubrication for the contact surfaces of the pitch bearing (i.e. between the races and rolling elements) to avoid damage to the bearing.

For conventional pitch bearings, however, lubricant is known to spill or leak inside and outside of the hub, thereby causing environmental health and safety concerns. Moreover, certain conventional lubrication systems are complex, costly, and difficult to service.

Accordingly, an improved lubrication system for a pitch bearing of a wind turbine that addresses the aforementioned issues would be welcomed in the technology.

BRIEF DESCRIPTION

Aspects and advantages of the invention will be set forth in part in the following description, or may be obvious from the description, or may be learned through practice of the invention.

In one aspect, the present disclosure is directed to a lubrication system for a slewing ring bearing of a wind turbine. The lubrication system includes the slewing ring bearing having an outer race, an inner race arranged concentrically within the outer race, and a plurality of rolling elements positioned between the outer and inner races. The inner race is rotatable with respect to the outer race. The lubrication system also includes a lubricant for lubricating contact surfaces between the outer race, the inner race, and the plurality of rolling elements. Further, the lubrication system includes at least one lubricant inlet formed into a first side of the inner race of the slewing ring bearing and at least one inlet seal for sealing the at least one lubricant inlet so as to prevent the lubricant from leaking from the at least one lubricant inlet. Moreover, the lubrication system includes at least one lubricant outlet formed into an opposing, second side of the inner race of the slewing ring bearing and at least one lubricant collection container arranged adjacent to and in fluid communication with the at least one lubricant outlet. The lubricant collection container(s) is mounted to the inner race of the slewing ring bearing. Thus, during operation of the wind turbine, at least one of a slope of the slewing ring bearing, gravity, and a centrifugal effect cause the lubricant to flow throughout the slewing ring bearing to lubricate the contact surfaces between the outer race, the inner race, and the plurality of rolling elements without exiting a closed volume defined by the inlet seal(s) and the lubricant collection container(s).

In another aspect, the present disclosure is directed to a wind turbine. The wind turbine includes a tower, a nacelle mounted on the tower, a rotor mounted to the nacelle and having a rotatable hub with at least one rotor blade mounted thereto. The wind turbine also includes a pitch bearing secured between the rotatable hub and the rotor blade(s) for facilitating rotation of the rotor blade(s) about a pitch axis. The pitch bearing includes an outer race, an inner race arranged concentrically within the outer race, and a plurality of rolling elements positioned between the outer and inner races. The inner race is rotatable with respect to the outer race. The wind turbine also includes a lubrication system. The lubrication system includes a lubricant for lubricating contact surfaces between the outer race, the inner race, and the plurality of rolling elements. Further, the lubrication system includes at least one lubricant inlet formed into a first side of the inner race of the slewing ring bearing and at least one inlet seal for sealing the at least one lubricant inlet so as to prevent the lubricant from leaking from the at least one lubricant inlet. Moreover, the lubrication system includes at least one lubricant outlet formed into an opposing, second side of the inner race of the slewing ring bearing and at least one lubricant collection container arranged adjacent to and in fluid communication with the at least one lubricant outlet. The lubricant collection container(s) is mounted to the inner race of the slewing ring bearing. Thus, during operation of the wind turbine, at least one of a slope of the slewing ring bearing, gravity, and a centrifugal effect cause the lubricant to flow throughout the slewing ring bearing to lubricate the contact surfaces between the outer race, the inner race, and the plurality of rolling elements without exiting a closed volume defined by the inlet seal(s) and the lubricant collection container(s). It should be understood that the wind turbine may further include any one of or a combination of the features and/or embodiments as described herein.

These and other features, aspects and advantages of the present disclosure will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
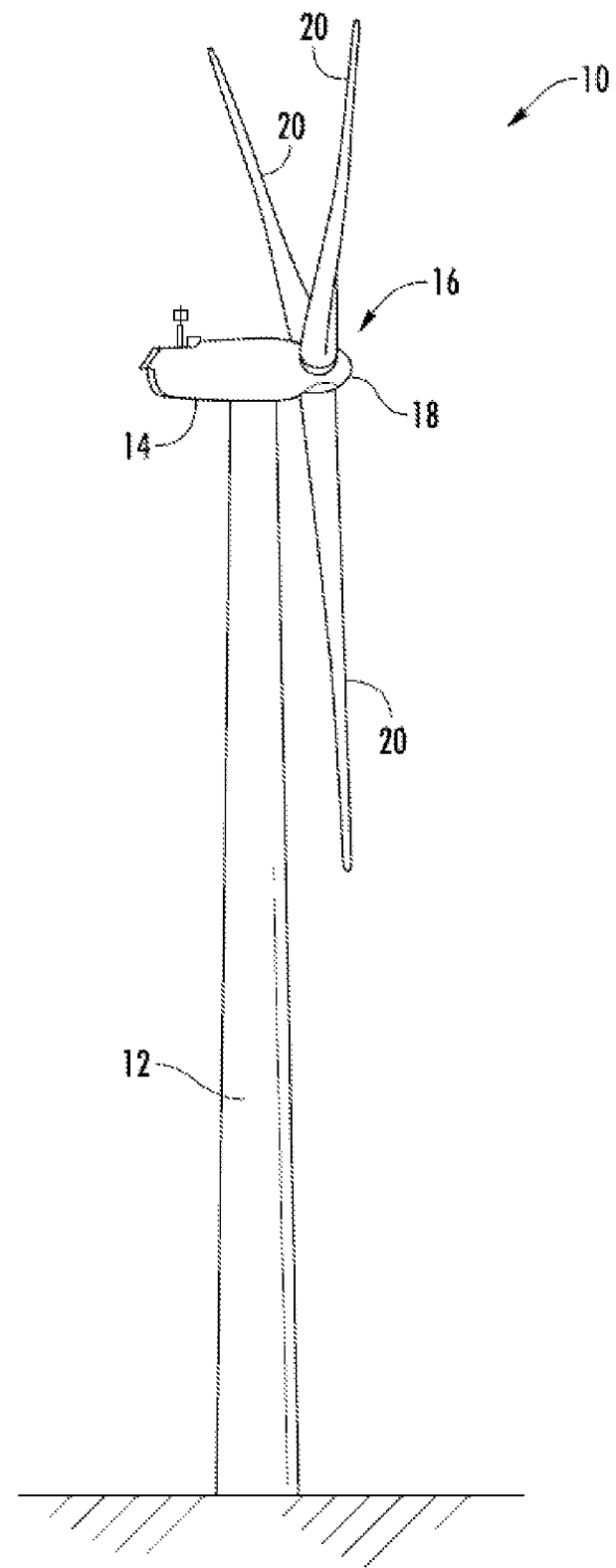
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

In general, the present disclosure is directed to a lubrication system for a pitch bearing of a wind turbine includes a lubricant for lubricating contact surfaces between an outer race, an inner race, and a plurality of rolling elements of the pitch bearing. Further, the lubrication system includes a lubricant inlet formed into a first side of the inner race and an inlet seal for sealing the lubricant inlet so as to prevent the lubricant from leaking from the lubricant inlet. Moreover, the lubrication system includes a lubricant outlet formed into an opposing, second side of the inner race and a lubricant collection container arranged adjacent to and in fluid communication with the lubricant outlet and mounted to the inner race. Thus, during operation of the wind turbine, at least one of a slope of the pitch bearing, gravity, and a centrifugal effect cause the lubricant to flow throughout the pitch bearing to lubricate the contact surfaces without exiting a closed volume defined by the inlet seal(s) and the lubricant collection container(s).

As such, the lubrication system of the present disclosure provides numerous advantages not present in the cited art. For example, the lubrication system prevents lubricant leakage due to both sides of the pitch bearing being sealed. Thus, there is no lubricant leakage inside and/or outside of the hub due to the seal(s) and the lubricant collection container(s), thereby reducing slip hazards inside the hub and environmental issues outside of the hub. Furthermore, lubricant entry is in a limited location (i.e., on an upwind side of the pitch bearing). As such, maintenance events can be reduced with optimized lubricant quantity at each event. Moreover, the lubrication system of the present disclosure is easily accessible for serviceability.

It should be further understood that the present disclosure is described herein as it may relate to wind turbine bearings, including, at least, yaw bearings, pitch bearings, and/or similar. It should be appreciated, however, that the unique bearings in accordance with principles of the present disclosure is not limited to use with a wind turbine, but is applicable to any suitable bearing application.

Referring now to the drawings, FIG. 1 illustrates a perspective view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 224 (FIG. 2) positioned within the nacelle 14 to permit electrical energy to be produced.

Figure 2:
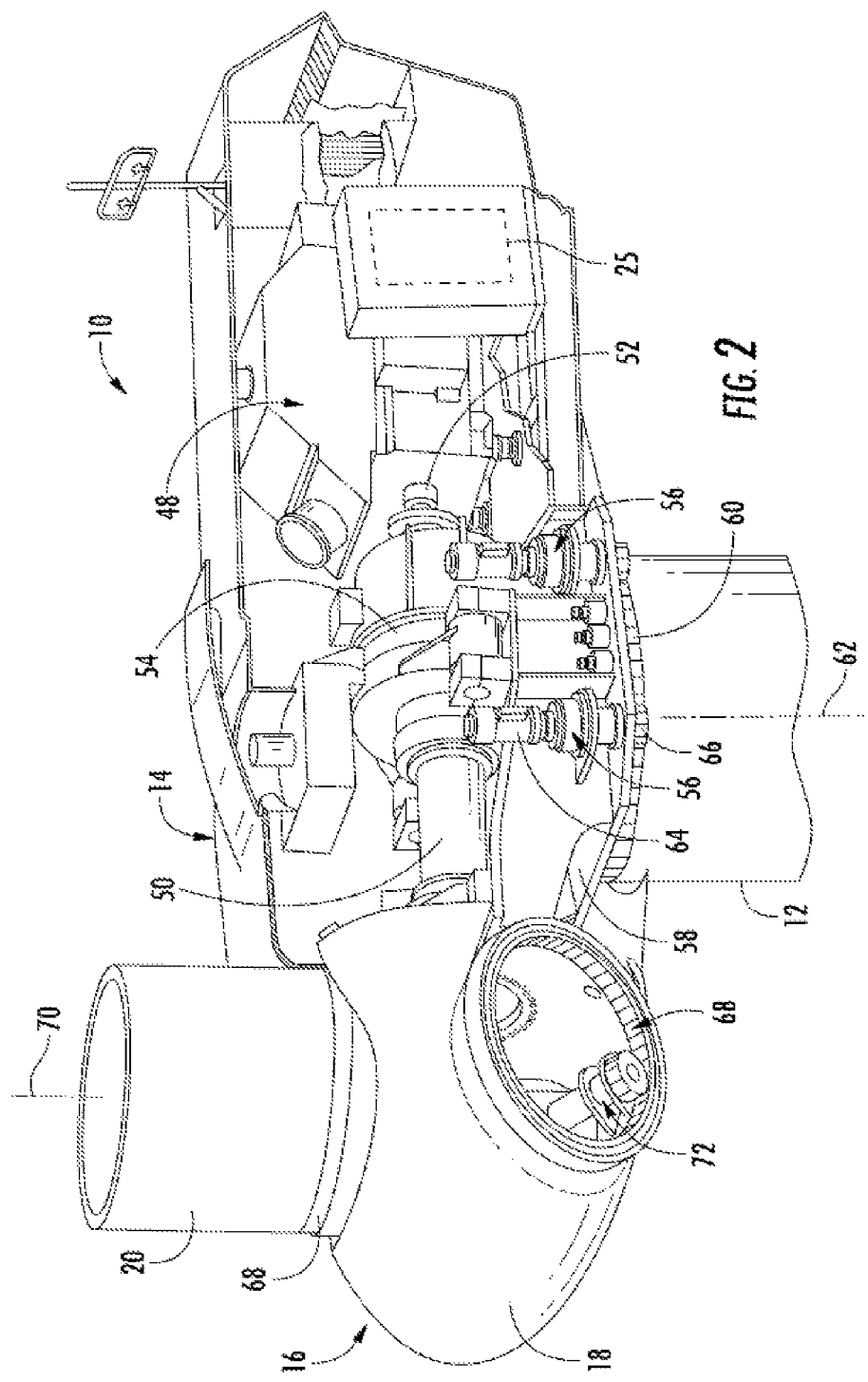
FIG. 2 illustrates a perspective, internal view of the nacelle of the wind turbine shown in FIG. 1.

Referring now to FIG. 2, a simplified, internal view of one embodiment of the nacelle 14 of the wind turbine 10 shown in FIG. 1 is illustrated. As shown, a generator 48 may be disposed within the nacelle 16. In general, the generator 48 may be coupled to the rotor 16 of the wind turbine 10 for generating electrical power from the rotational energy generated by the rotor 16. For example, the rotor 16 may include a rotor shaft 50 coupled to the hub 18 for rotation therewith. The generator 48 may then be coupled to the rotor shaft 50 such that rotation of the rotor shaft 50 drives the generator 48. For instance, in the illustrated embodiment, the generator 48 includes a generator shaft 52 rotatably coupled to the rotor shaft 50 through a gearbox 54. However, in other embodiments, it should be appreciated that the generator shaft 52 may be rotatably coupled directly to the rotor shaft 50. Alternatively, the generator 48 may be directly rotatably coupled to the rotor shaft 50 (often referred to as a "direct-drive wind turbine").

Additionally, the wind turbine 10 may include a turbine controller 25 for controlling the various components thereof. Further, in an embodiment, the wind turbine 10 may include one or more yaw drive mechanisms 56 mounted to and/or through a bedplate 58 positioned atop the tower 12. Specifically, each yaw drive mechanism 56 may be mounted to and/or through the bedplate 58 so as to engage a yaw bearing 60 coupled between the bedplate 58 and the tower 12 of the wind turbine 10. The yaw bearing 60 may be mounted to the bed plate 58 such that, as the yaw bearing 60 rotates about a yaw axis 62 of the wind turbine 10, the bedplate 58 and, thus, the nacelle 14 are similarly rotated about the yaw axis.

Referring still to FIG. 2, the wind turbine 10 may also include a plurality of pitch bearings 68, with each pitch bearing 68 being coupled between the hub 18 and one of the rotor blades 20. As will be described below, the pitch bearings 68 may be configured to allow each rotor blade 20 to be rotated about its pitch axis 70 (e.g., via a pitch adjustment mechanism 72), thereby allowing the orientation of each blade 20 to be adjusted relative to the direction of the wind. It should be appreciated that, as used herein, the term "slewing bearing" may be used to refer to the yaw bearing 60 of the wind turbine 10 and/or one of the pitch bearings 68 of the wind turbine 10 or any other similar bearing.

In general, it should be appreciated that the yaw drive mechanism(s) 56 and/or the pitch adjustment mechanism(s) 72 may have any suitable configuration and may include any suitable components known in the art that allow such mechanisms 56 to function as described herein. For example, as shown in FIG. 2, each yaw drive mechanism 56 may include a yaw motor 64 mounted to the bedplate 58. The yaw motor 64 may be coupled to a yaw gear 66 (e.g., a pinion gear) configured to engage the yaw bearing 60. For instance, the yaw motor 64 may be coupled to the yaw gear 66 directly (e.g., by an output shaft (not shown) extending through the bedplate 58) or indirectly through a suitable gear assembly coupled between the yaw motor 64 and the yaw gear 66. As such, the torque generated by the yaw motor 64 may be transmitted through the yaw gear 66 and applied to the yaw bearing 60 to permit the nacelle 14 to be rotated about the yaw axis 62 of the wind turbine 10. It should be appreciated that, although the illustrated wind turbine 10 is shown as including two yaw drive mechanisms 56, the wind turbine 10 may generally include any suitable number of yaw drive mechanisms 56. Similarly, it should be appreciated that the yaw bearing 60 may generally have any suitable configuration, including one or more of the bearing configurations described below. In addition, the pitch adjustment mechanism(s) 72 may be configured similar to, or the same as, the yaw drive mechanism(s) 56.

Figure 3:
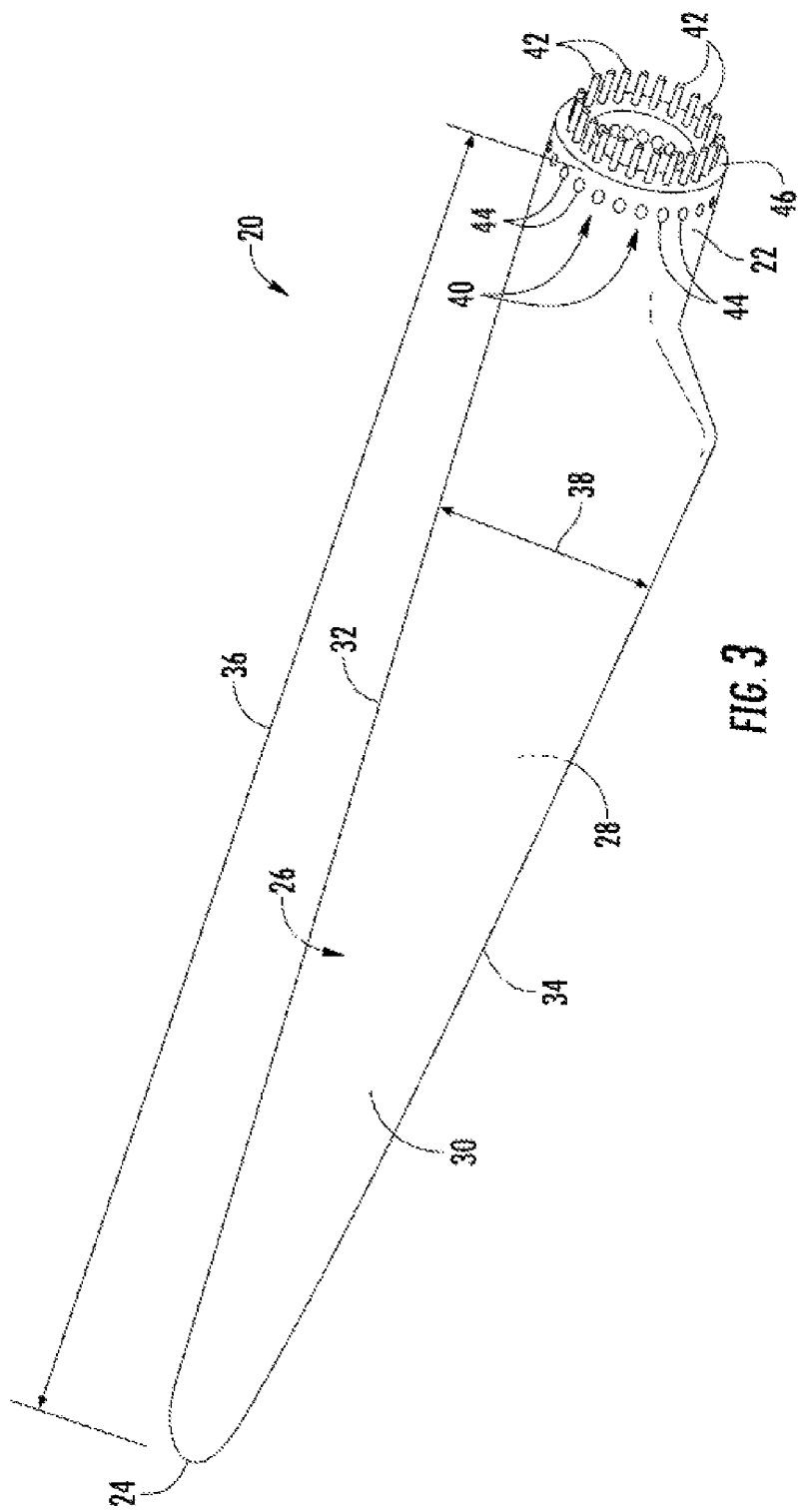
FIG. 3 illustrates a perspective view of one of the rotor blades of the wind turbine shown in FIG. 1.

Referring now to FIG. 3, a perspective view of one of the rotor blades 20 shown in FIGS. 1 and 2 is illustrated in accordance with aspects of the present disclosure. As shown, the rotor blade 20 includes a blade root 22 configured for mounting the rotor blade 20 to the hub 18 of the wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 44 mounted within a portion of the blade root 22 and a root bolt 42 coupled to and extending from the barrel nut 44 so as to project outwardly from a root end 46 of the blade root 22. By projecting outwardly from the root end 46, the root bolts 42 may generally be used to couple the blade root 22 to the hub 18 (e.g., via one of the pitch bearings 50), as will be described in greater detail below.

Figure 4:
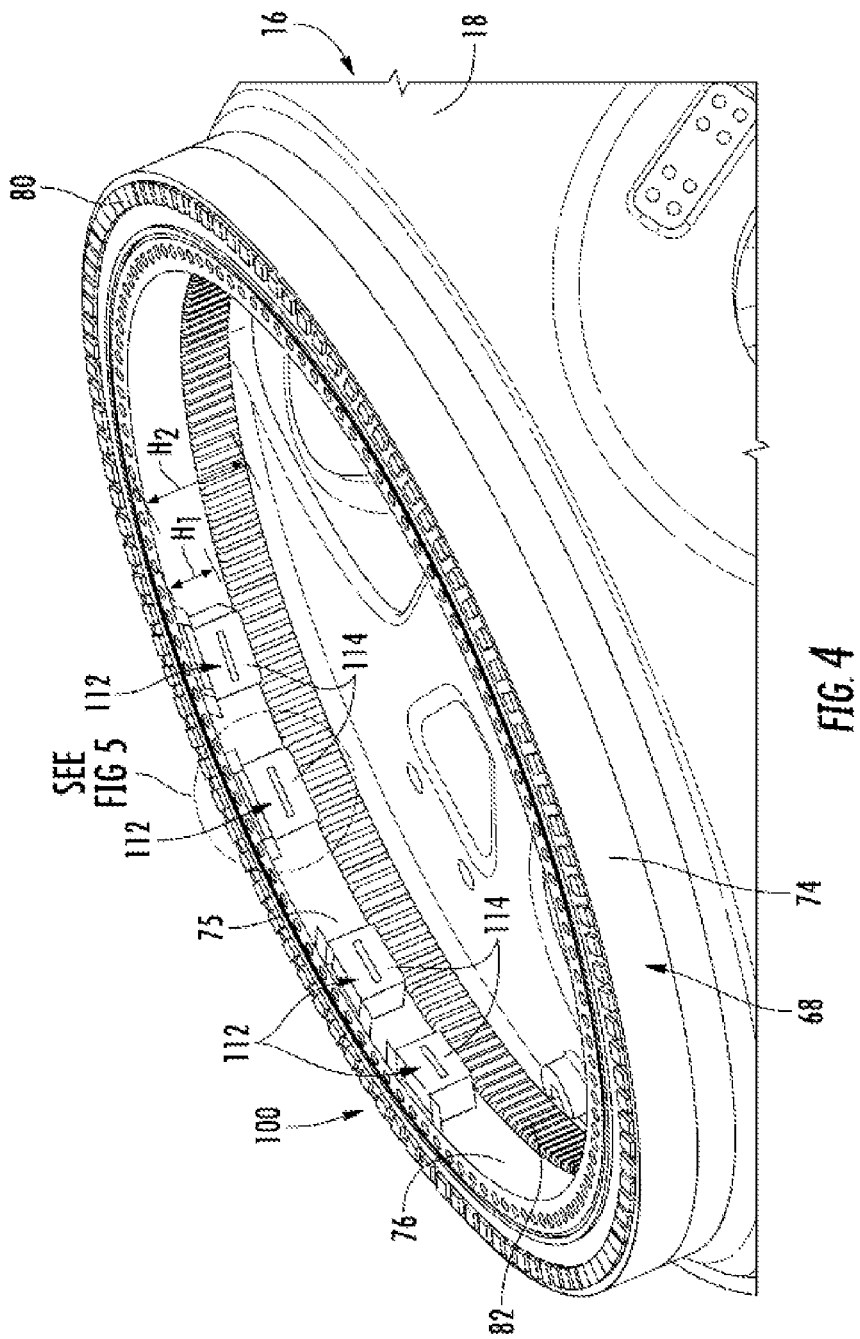
FIG. 4 illustrates a perspective view of an embodiment of a pitch bearing arranged with a hub of the wind turbine and a lubrication system mounted to the pitch bearing according to the present disclosure.

Referring now to FIGS. 4-95, various views of a lubrication system 100 for a slewing ring bearing, such as the pitch bearing 68 described herein, in accordance with aspects of the present disclosure are illustrated. As generally shown in FIGS. 4-8, the pitch bearing 68 includes an outer race 74, an inner race 76 concentrically within the outer race 74, and a plurality of rolling elements 78 (indicated schematically in FIGS. 6-7) disposed between the outer and inner races 74, 76. For example, in one embodiment, the plurality of rolling elements 78 may be roller bearings, ball bearings, or any other suitable type of bearing. Thus, the inner race 76 is rotatable relative to the outer race 74 via the rolling elements 78. Moreover, in an embodiment, the rolling elements 78 may be arranged in any suitable number of rows and/or columns. In particular, the illustrated embodiment illustrates the plurality of rolling elements 78 arranged in three rows of rolling elements. In other embodiments, the rolling elements 78 may be arranged in one row, two rows, or more than three rows as well as any suitable number of columns so as to accommodate bearings of various sizes.

Further, as shown in FIG. 4, the outer and inner races 74, 76 may generally be configured to be mounted to the hub 18 using a plurality of hub bolts 80 and/or other suitable fastening mechanisms. Similarly, the other of the outer and inner races 74, 76 may be configured to be mounted to the blade root 22 using the root bolts 42 (FIG. 3) of the root attachment assemblies 40. Thus, the outer and inner races 74, 76 are configured to rotate relative to each other (via the rolling elements 78 that are rotated via the pitch adjustment mechanism 72 that engage gear teeth 82) to allow the pitch angle of each rotor blade 20 to be adjusted.

Figure 9:
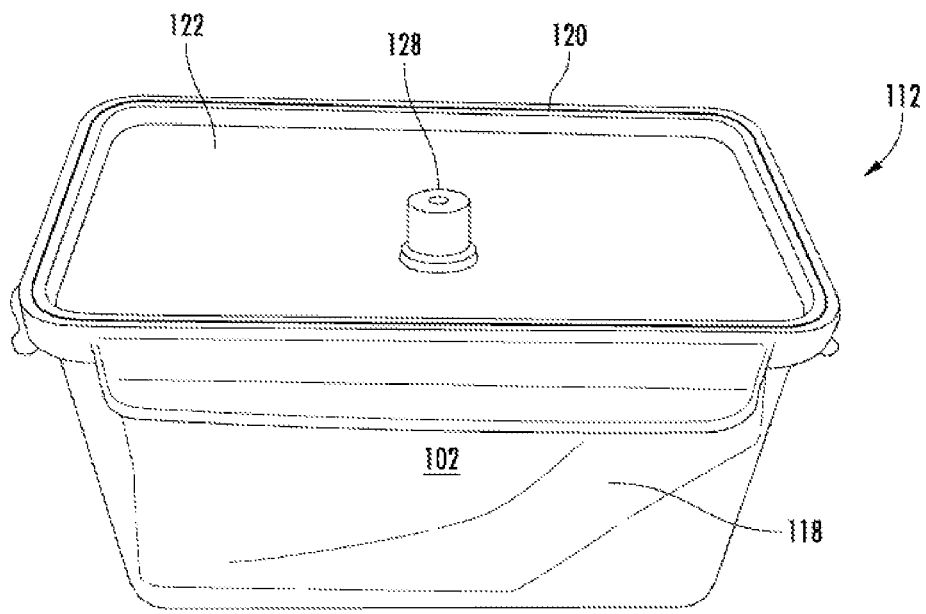
FIG. 9 illustrates a perspective view of a lubricant collection container of a lubrication system of a pitch bearing of a wind turbine according to the present disclosure.

Referring to FIG. 9, the lubrication system 100 also includes a lubricant 102 for lubricating contact surfaces between the outer race 74, the inner race 76, and the plurality of rolling elements 78. Further, as shown particularly in FIG. 7, the lubrication system 100 includes at least one lubricant inlet 104 formed into a first side 106 of the inner race 76 of the pitch bearing 68. For example, in an embodiment, the lubricant inlet(s) 104 is formed into an upwind side of the pitch bearing 68. Moreover, as shown, the lubrication system 100 includes at least one inlet seal 108 for sealing the lubricant inlet(s) 104 so as to prevent the lubricant 102 from leaking from the lubricant inlet(s) 104.

Figure 6:
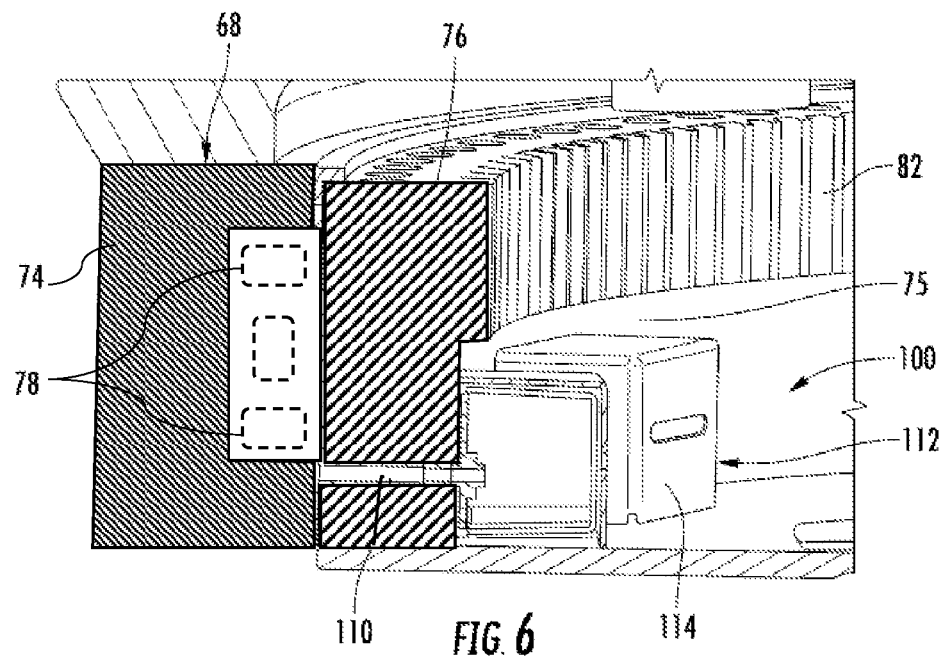
FIG. 6 illustrates a partial, perspective view of a downwind side of a lubrication system of a pitch bearing of a wind turbine according to the present disclosure.
Figure 7:
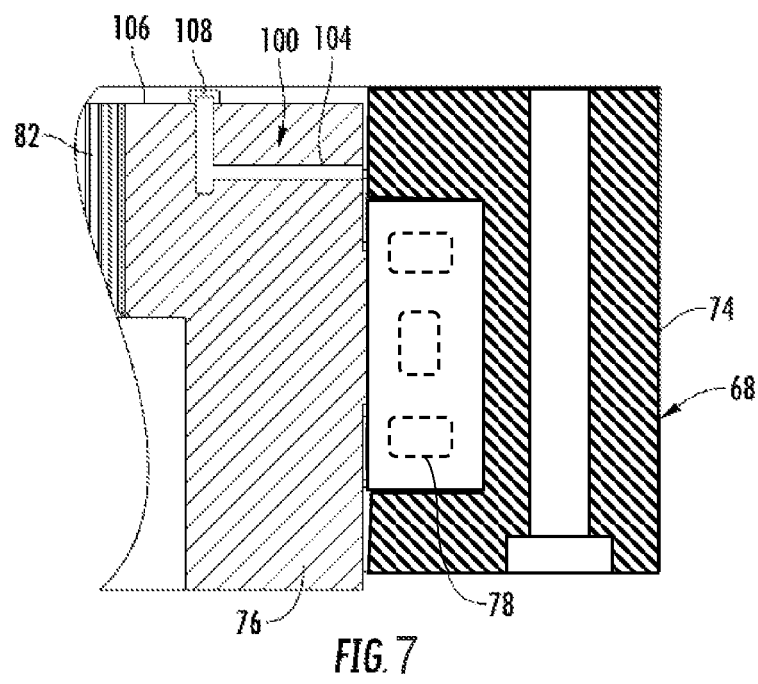
FIG. 7 illustrates a cross-sectional view of a lubrication system of a pitch bearing of a wind turbine according to the present disclosure, particularly illustrating a lubricant inlet of the lubrication system.
Figure 8:
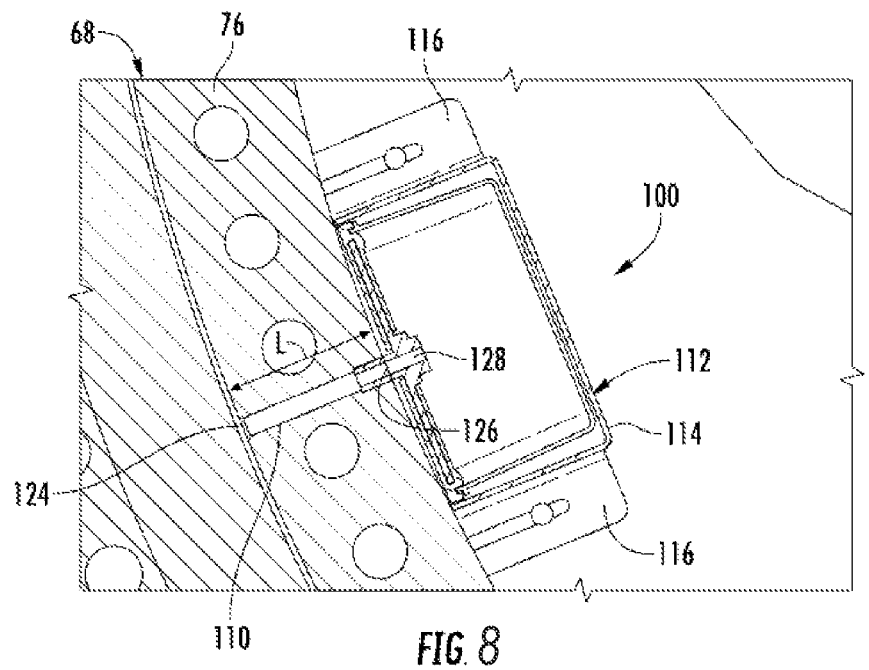
FIG. 8 illustrates a bottom view of a lubrication system of a pitch bearing of a wind turbine according to the present disclosure, particularly illustrating a lubricant outlet of the lubrication system.

In addition, as shown in FIG. 6, the lubrication system 100 includes at least one lubricant outlet 110 formed into an opposing, second side of the inner race 76 of the pitch bearing 68. For example, in an embodiment, the lubricant outlet(s) 110 is formed into an upwind side of the pitch bearing 68.

Referring now to FIGS. 4-6, 8, and 9, the lubrication system 100 further includes at least one lubricant collection container 112 arranged adjacent to and in fluid communication with the lubricant outlet(s) 110. Moreover, in an embodiment, as shown particularly in FIG. 8, the lubricant outlet(s) 110 defines an overall length (L) having a first end 124 and a second end 126. Further, as shown, in an embodiment, the overall length L may be straight (i.e., without a bend or curve) from the first end 124 to the second end 126 to prevent back flow from the lubricant collection container(s) 112 back into the inner race 76 of the pitch bearing 68.

Figure 5:
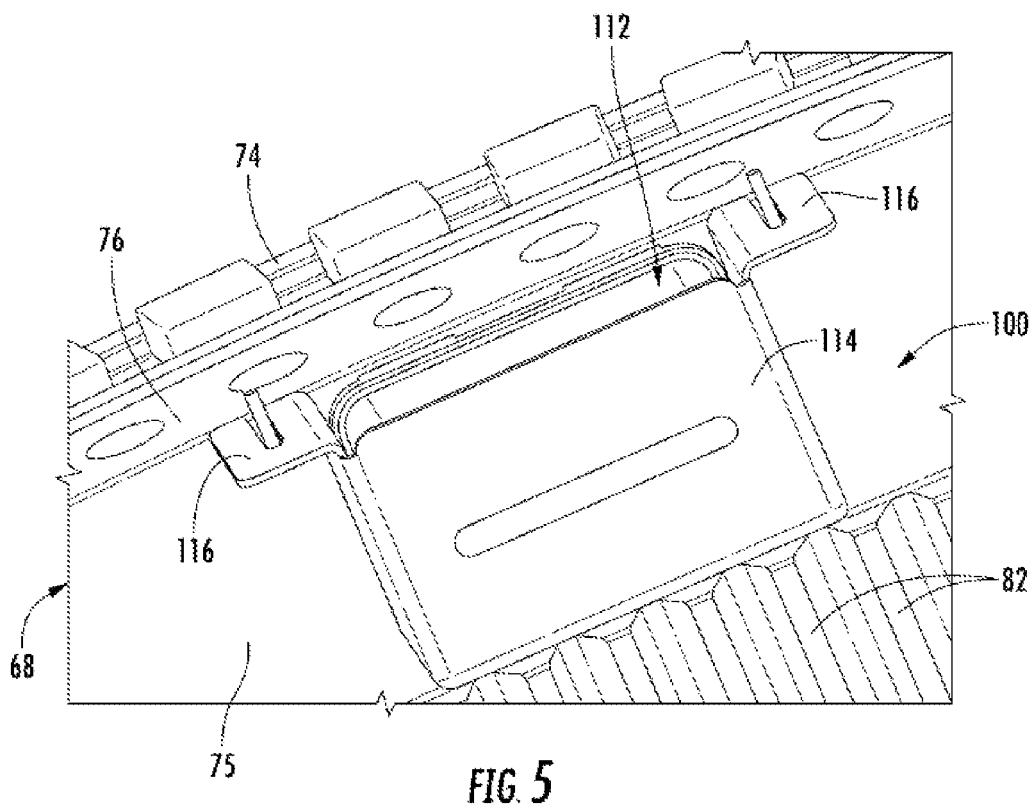
FIG. 5 illustrates a partial, detailed view of a lubrication system of a pitch bearing of a wind turbine according to the present disclosure.

More specifically, as shown in FIGS. 4-6, the lubricant collection container(s) 112 is mounted to an inner surface 75 of the inner race 76 of the pitch bearing 68. Thus, during operation of the wind turbine 10, a slope of the pitch bearing 68, gravity, and/or a centrifugal effect due to rotation of the rotor blade 20 is configured cause the lubricant 102 to flow throughout the pitch bearing 68 so as to lubricate the contact surfaces between the outer race 74, the inner race 76, and the plurality of rolling elements 78 without exiting a closed volume defined by the inlet seal(s) 108 and the lubricant collection container(s) 112.

Referring particularly now to FIG. 4, in certain embodiments, the lubrication system 100 may include a plurality of lubricant collection containers 112 arranged circumferentially on the downwind side of the inner race 76 of the pitch bearing 68. Moreover, as shown particularly in FIG. 4, the lubricant collection container(s) 112 each define a height ($H_1$) that is less than a height ($H_2$) of the inner race 76 of the pitch bearing 68. Further, as shown, the lubricant collection container(s) 112 is mounted adjacent to the gear teeth 82 of the inner race 76 of the pitch bearing 68. Thus, as shown, the lubricant collection container(s) 112 can be easily mounted to the inner surface 75 of the inner race 76 without interfering with the gear teeth 82.

Referring particularly now to FIGS. 4-6 and 8, the lubrication system 100 may further include a cover member 114 for mounting the lubricant collection container(s) 112 to the inner race 76 of the pitch bearing 68. In such embodiments, the cover member 114 may be sized such that the lubricant collection container(s) 112 fits securely therein. In addition, as shown in the illustrated embodiment of FIGS. 5 and 10, the cover member 114 may include one or more flanges 116 for mounting the lubricant collection container(s) 112 to the inner race 76 of the pitch bearing 68. In particular, as shown, the flanges 116 of the cover member 114 may be mounted or otherwise secured to the inner race 76 of the pitch bearing 68 via one or more fasteners, adhesives, or similar.

Referring now to FIG. 9, the lubricant collection container(s) 112 may further include a lubricant collection bag 118 arranged therein for collecting the lubricant 102. Moreover, as shown in FIG. 9, the lubricant collection container(s) 112 may also include a seal 120 to prevent the lubricant 102 from leaking from the lubricant collection container(s) 112 and into the hub 18 of the wind turbine 10. For example, as shown in FIG. 9, the seal 120 is arranged around a perimeter of a lid 122 of the lubricant collection container(s) 112 to prevent the lubricant 102 from leaking from the lubricant collection container(s) 112 once the lubricant exits from the lubricant outlet(s) 110.

The lubricant collection container(s) 112 may further include a fitting 128 configured to be arranged at the second end 126 of the lubricant outlet(s) 110 for further preventing back flow from the lubricant collection container(s) 112 back into the inner race 76 of the pitch bearing 68. In particular, the fitting 128 may include various sealing members arranged therewith for securing the lubricant collection container(s) 112 to the second end 126 of the lubricant outlet(s) 110 and to also prevent backflow. Further, the fitting 128 of the lubricant collection container(s) 112 may also include a bag lock to ensure that the lubricant 102 entering the lubricant collection container(s) 112 flows into the lubricant collection bag 118.

In still further embodiments, the lubricant collection container(s) 112 can be easily monitored, for example, by being constructed of a transparent material, such that an operator can easily view the contents (e.g., the lubricant 102) therein for monitoring a condition of the lubricant 102. In further embodiments, the lubricant collection container(s) 112 may be equipped with one or more sensors configured to communicate with the turbine controller 25 regarding the condition of the lubricant 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lubrication system for a slewing ring bearing of a wind turbine, the lubrication system comprising:
the slewing ring bearing comprising an outer race, an inner race arranged concentrically within the outer race, and a plurality of rolling elements positioned between the outer and inner races, the inner race rotatable with respect to the outer race;
a lubricant for lubricating contact surfaces between the outer race, the inner race, and the plurality of rolling elements;
at least one lubricant inlet formed into a first side of the inner race of the slewing ring bearing;
at least one inlet seal for sealing the at least one lubricant inlet so as to prevent the lubricant from leaking from the at least one lubricant inlet;
at least one lubricant outlet formed into an opposing, second side of the inner race of the slewing ring bearing; and
at least one lubricant collection container arranged adjacent to and in fluid communication with the at least one lubricant outlet, the at least one lubricant collection container being mounted to the inner race of the slewing ring bearing,
wherein, during operation of the wind turbine, at least one of a slope of the slewing ring bearing, gravity, and a centrifugal effect cause the lubricant to flow throughout the slewing ring bearing to lubricate the contact surfaces between the outer race, the inner race, and the plurality of rolling elements without exiting a closed volume defined by the at least one inlet seal and the at least one lubricant collection container,
wherein the at least one lubricant outlet defines an overall length having a first end and a second end, wherein the overall length is straight from the first end to the second end to prevent back flow from the at least one lubricant collection container back into the inner race.

2. The lubrication system of claim 1, wherein the slewing ring bearing is a pitch bearing of the wind turbine.

3. The lubrication system of claim 1, wherein the first side of the inner race of the slewing ring bearing is an upwind side of the inner race and the opposing, second side of the inner race of the slewing ring bearing is a downwind side of the inner race of the slewing ring bearing.

4. The lubrication system of claim 3, further comprising a plurality of lubricant collection containers arranged circumferentially on the downwind side of the inner race of the slewing ring bearing.

5. The lubrication system of claim 1, wherein the at least one lubricant collection container defines a height less than a height of the inner race of the slewing ring bearing.

6. The lubrication system of claim 5, wherein the at least one lubricant collection container is mounted adjacent to a plurality of gear teeth of the inner race of the slewing ring bearing.

7. The lubrication system of claim 1, further comprising a cover member for mounting the at least one lubricant collection container to the inner race of the slewing ring bearing.

8. The lubrication system of claim 7, wherein the cover member further comprises one or more flanges for mounting the at least one lubricant collection container to the inner race of the slewing ring bearing.

9. The lubrication system of claim 1, wherein the at least one lubricant collection container further comprises a lubricant collection bag arranged therein for collecting the lubricant.

10. The lubrication system of claim 1, wherein the at least one lubricant collection container further comprises a seal to prevent the lubricant from leaking from the at least one lubricant collection container and into a hub of the wind turbine.

11. The lubrication system of claim 1, wherein the at least one lubricant collection container further comprises a fitting arranged at the second end of the at least one lubricant outlet for further preventing back flow from the at least one lubricant collection container back into the inner race.

12. The lubrication system of claim 1, wherein the at least one lubricant collection container is transparent for monitoring a condition of the lubricant.

13. The lubrication system of claim 1, wherein the plurality of rolling elements comprise three rows of rolling elements.

14. The lubrication system of claim 1, wherein the plurality of rolling elements comprise roller bearings.

15. A wind turbine, comprising:
a tower;
a nacelle mounted on the tower;
a rotor mounted to the nacelle and comprising a rotatable hub with at least one rotor blade mounted thereto;
a pitch bearing secured between the rotatable hub and the at least one rotor blade for facilitating rotation of the at least one rotor blade about a pitch axis, the pitch bearing comprising an outer race, an inner race arranged concentrically within the outer race, and a plurality of rolling elements positioned between the outer and inner races, the inner race rotatable with respect to the outer race; and
a lubrication system comprising:
a lubricant for lubricating contact surfaces between the outer race, the inner race, and the plurality of rolling elements;
at least one lubricant inlet formed into a first side of the inner race of the pitch bearing;
at least one inlet seal for sealing the at least one lubricant inlet so as to prevent the lubricant from leaking from the at least one lubricant inlet;
at least one lubricant outlet formed into an opposing, second side of the inner race of the pitch bearing; and
at least one lubricant collection container arranged adjacent to and in fluid communication with the at least one lubricant outlet, the at least one lubricant collection container being mounted to the inner race of the pitch bearing,
wherein, during operation of the wind turbine, at least one of a slope of the pitch bearing, gravity, and a centrifugal effect cause the lubricant to flow throughout the pitch bearing to lubricate the contact surfaces between the outer race, the inner race, and the plurality of rolling elements without exiting a closed volume defined by the at least one inlet seal and the at least one lubricant collection container,
wherein the at least one lubricant outlet defines an overall length having a first end and a second end, wherein the overall length is straight from the first end to the second end to prevent back flow from the at least one lubricant collection container back into the inner race.

16. The wind turbine of claim 15, wherein the first side of the inner race of the pitch bearing is an upwind side of the inner race and the opposing, second side of the inner race of the pitch bearing is a downwind side of the inner race of the pitch bearing.

17. The wind turbine of claim 16, further comprising a plurality of lubricant collection containers arranged circumferentially on the downwind side of the inner race of the pitch bearing.

18. The wind turbine of claim 15, wherein the at least one lubricant collection container defines a height less than a height of the inner race of the pitch bearing.

19. The wind turbine of claim 15, wherein the lubrication system further comprises a cover member for mounting the at least one lubricant collection container to the inner race of the pitch bearing and a lubricant collection bag arranged within the at least one lubricant collection container for collecting the lubricant.

* * * * *